US006234691B1

(12) United States Patent
Jones et al.

(10) Patent No.: US 6,234,691 B1
(45) Date of Patent: May 22, 2001

(54) APPARATUS FOR MOUNTING A SURVEILLANCE CAMERA

(75) Inventors: Theodore L. Jones, Akron; Christopher J. Ryan, Lancaster, both of PA (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/094,793

(22) Filed: Jun. 15, 1998

(51) Int. Cl.[7] .......... G03B 17/00
(52) U.S. Cl. .......... 396/427; 348/143
(58) Field of Search .......... 396/419, 427, 396/428, 25, 27, 29; 348/81, 143, 150, 151

(56) References Cited

U.S. PATENT DOCUMENTS

| | | | | |
|---|---|---|---|---|
| 4,320,949 | * | 3/1982 | Pagano | 396/427 |
| 4,764,008 | * | 8/1988 | Wren | 396/427 |
| 4,920,367 | * | 4/1990 | Pagano | 396/427 |
| 5,223,872 | * | 6/1993 | Stiepel et al. | 396/427 |
| 5,240,220 | * | 8/1993 | Elberbaum | 396/427 |
| 5,418,567 | * | 5/1995 | Boers et al. | 348/143 |
| 5,649,255 | * | 7/1997 | Schieltz | 396/427 |
| 5,689,304 | * | 11/1997 | Jones et al. | 348/143 |
| 5,852,754 | * | 12/1998 | Schneider | 396/427 |

* cited by examiner

*Primary Examiner*—David M. Gray
(74) *Attorney, Agent, or Firm*—Russell Gross

(57) ABSTRACT

A camera housing is fixed against rotation in a cavity in a backbox which is mounted in a ceiling. The housing carries a camera module which is rotatable about a vertical axis with respect to the housing, the module in turn carrying a camera which is pivotable about a horizontal axis with respect to the module. The housing is held in place in the cavity by a locking ring which is received around the camera module and engages a backbox ring fixed to the backbox. The locking ring has an outward facing cylindrical surface which is concentrically received in an inward facing cylindrical surface of the backbox ring. The surface on the locking ring has cam followers which ride up a cam ridge on the surface of the backbox ring as the locking ring is rotated, in order to position the camera housing in the backbox. A spring loaded detent mechanism holds the locking ring in the locked position until it is counter-rotated to overcome the spring force.

12 Claims, 5 Drawing Sheets

APPARATUS FOR MOUNTING A SURVEILLANCE CAMERA

BACKGROUND OF THE INVENTION

This invention relates to apparatus for mounting a surveillance camera, in particular a covered ceiling mounted camera which is rotatable about vertical and horizontal axes.

U.S. Pat. No. 5,649,255 discloses apparatus for mounting a surveillance camera including a base which is fixed to a ceiling, and a housing cap which is fixed to the base by rotation to engage spring clips on the base in the manner of a bayonet. A camera is mounted to the cap, and a housing is fixed over the camera. The housing, camera, and cap are removed from the base as a unit by means of a special tool having fingers which move radially inward to deflect spring clips; the clips cannot otherwise be released. Apparatus including motors for operating the camera are apparently disposed in the housing, but details are not disclosed.

Power and signal connections for the camera are provided by brushes extending from a PCB mounted in the base and contacting concentric arcuate traces on a PCB mounted in the housing cap. This is necessary because the entire camera module must be rotated during installation and removal from the base. As such standard electrical connectors such as card edge connectors cannot be used.

Another disadvantage of the prior art apparatus is that virtually the entire assembly must be mounted below the ceiling in order to access the release mechanism. As such it is not very discreet and is vulnerable to attack.

SUMMARY OF THE INVENTION

According to the invention a backbox which can be mounted substantially flushly with the ceiling receives a camera housing in a cavity so that only a camera module covered by a dome window extend below the ceiling.

The backbox cavity is formed by a top and a substantially cylindrical sidewall with opposed parallel flats. The camera housing is also provided with flats, so it can be received in the backbox cavity in only one angular orientation. The camera housing carries vertically mounted PCB's which mate with card edge connectors on the top and sidewall in the cavity when the housing is fully received in the cavity. Electrical connections are thus achieved with conventional connectors.

The backbox is provided with a backbox ring having a bottom flange as the only feature below the ceiling. The backbox ring has an inward facing cylindrical surface with retaining features which mate with retaining features on the outward facing cylindrical surface of a locking ring. In a preferred embodiment the retaining features include a pair of opposed camming ridges on the backbox ring, and a pair of top cam followers on the locking ring. When the housing is aligned in the cavity, rotating the locking ring causes the followers to ride on top of the cam ridges to push the housing home, thereby giving the installer a mechanical advantage for completing electrical connections such as PCB's in card edge connectors. Bottom followers riding on a bottom surface of the cam ridge prevent overtravel. The retaining features further include a spring loaded detent mechanism which holds the locking ring in place, the holding force being overcome by counter-rotating the locking ring.

In addition to securing the camera housing in the cavity of the backbox, the locking ring also provides mounting features for a stationary dome fitted over the camera module. Pivoting of the camera about a horizontal axis and rotation of the module about a vertical axis thus occur discretely under the dome, which also provides protection. A trim ring fitted over a flange on the dome and the locking ring is releasably attached to the backbox ring.

The foregoing and other advantages of the invention will be apparent from the drawings and description.

DETAILED DESCRIPTION OF THE PREFERRED EMBODIMENT

Figure 1:
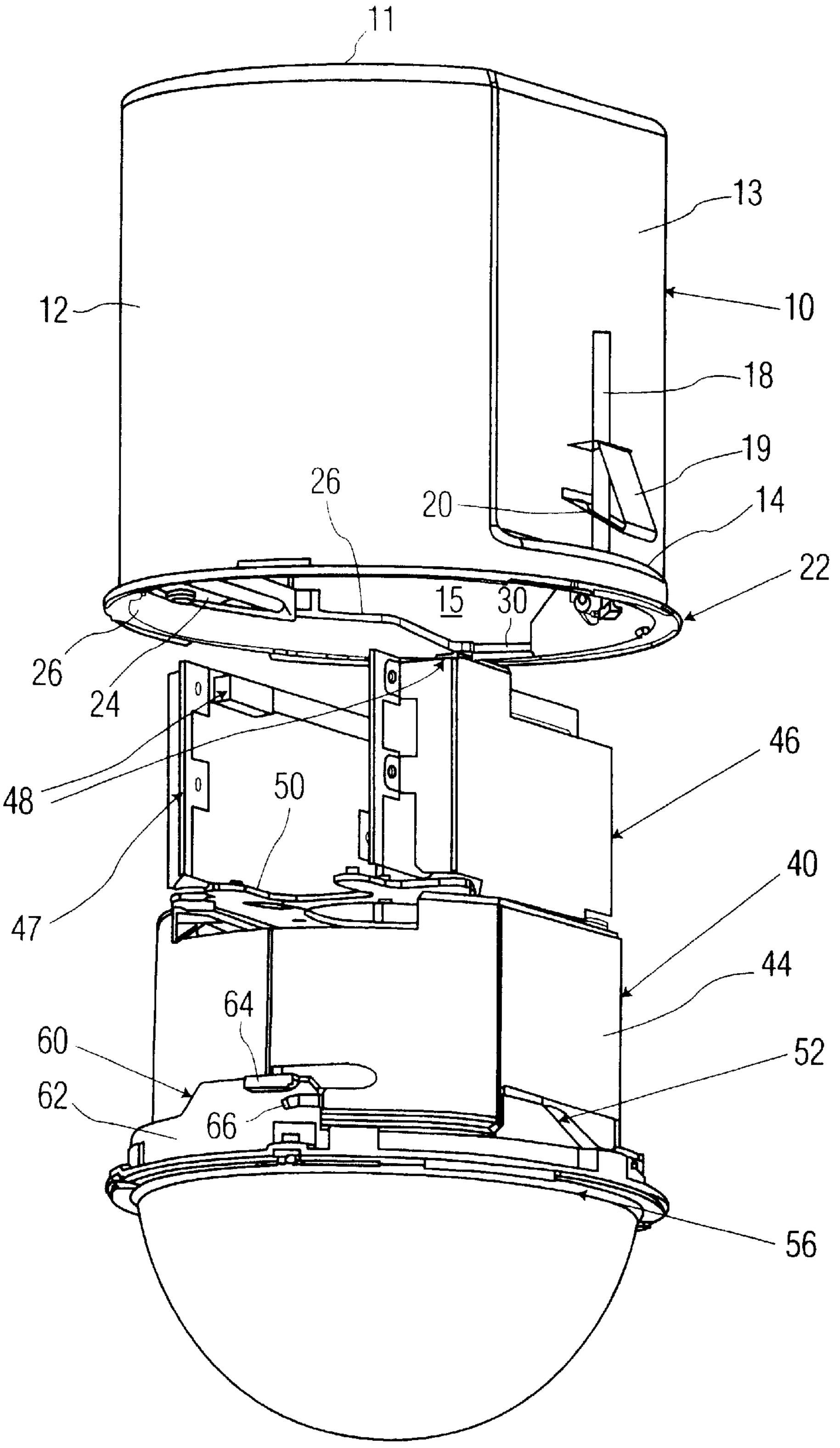
FIG. 1 is a perspective of the assembled locking ring, camera housing and dome exploded from the backbox housing.

Referring to FIG. 1, a backbox 10 has a top 11 and a cylindrical wall 12 enclosing a cavity 15. The wall 12 is interrupted by a pair of flats 13 which extend down to shoulders 14 for mounting backbox ring 22. Threaded posts 18 extending upward from shoulders 14 carry spring clips 19 which are used to fix the backbox 10 in a circular aperture in a ceiling.

The backbox ring 22 has a bottom flange 23, mounting shoulders 24 which are riveted to shoulders 14, and an inward facing cylindrical surface 26. The surface 26 is provided with features including a cam ridge 28 and a slot 30 as will be described.

The cavity 15 is profiled to receive a camera housing 40 having a cylindrical sidewall 42 with flats 44 in one orientation, the flats 44 being received adjacent flats 13 to prevent rotation. The camera housing 40 carries mounts 46 for printed circuit boards 47 and a platform 50 for electric motors (not shown) for controlling motion of a camera module and a camera (not shown) mounted thereon. The printed circuit boards 47 mate with card edge connectors fixed in the cavity 15. The camera housing 40 and camera module 52 (FIG. 4) are retained in the backbox 10 by means of locking ring 60 having a cylindrical outer wall 62.

Figure 2:
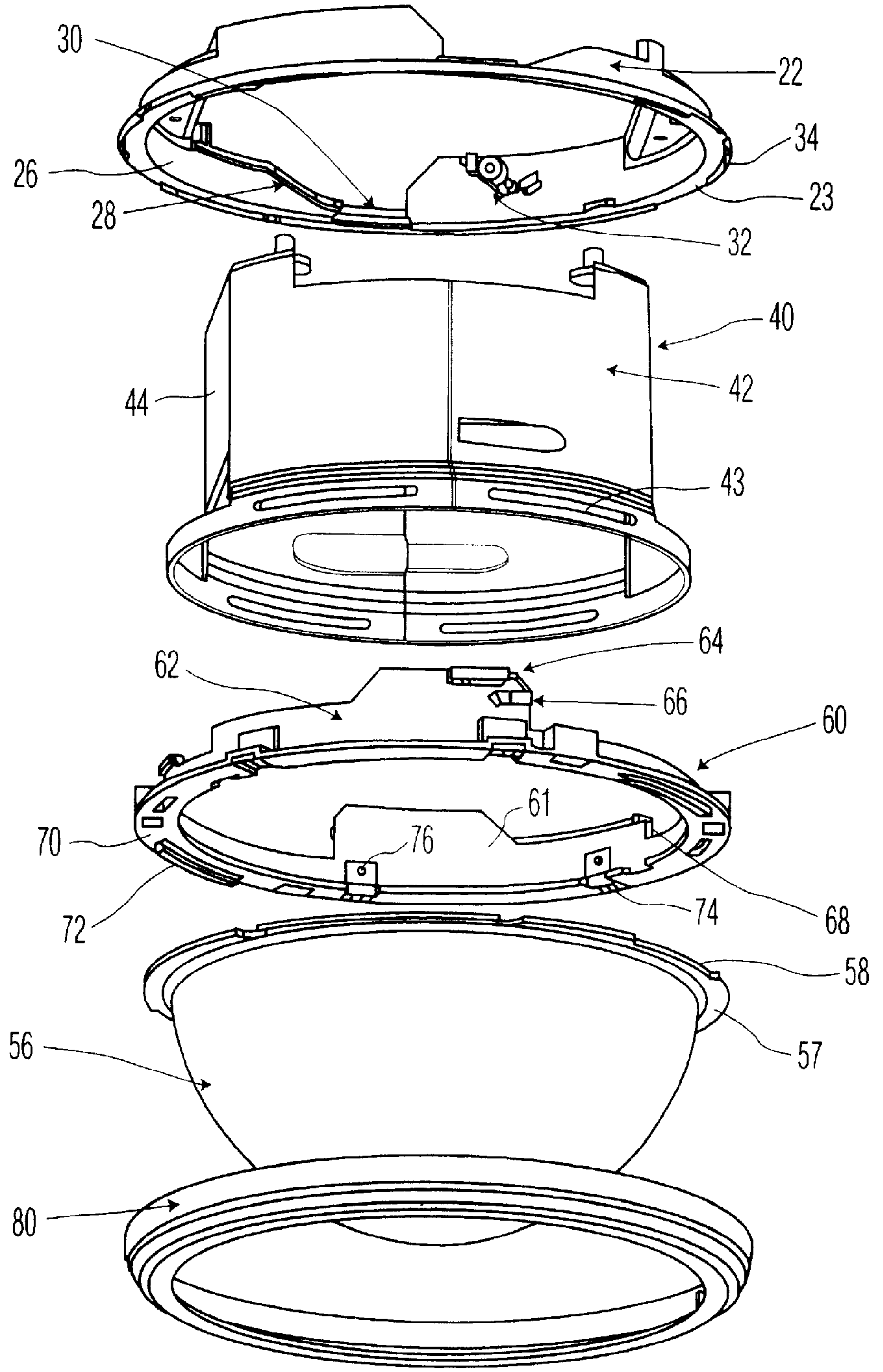
FIG. 2 is an exploded perspective of the backbox ring, camera housing, lock ring, dome, and trim ring.

Referring to FIG. 2, the backbox ring 22 is shown isolated from the backbox 10 (FIG. 1), above the camera housing 40, the locking ring 60, the dome 56, and trim ring 80. The inward facing cylindrical surface 26 is provided with a cam ridge 28, a slot 30 for receiving cam follower 64, and a spring loaded detent mechanism 32. The locking ring 60 has an inward facing cylindrical surface 61 and an outward facing cylindrical surface 62 profiled for concentric reception in the inward facing surface 26 of the backbox ring 22. The top cam followers 64 (only one is visible) are received in slots 30, and the locking ring 60 is rotated so that the top follower rides on ridge 28 and the camera housing 40 is pushed home in cavity 15. Bottom followers 66 ride underneath the cam ridge 28 and prevent overtravel, whereby the camera housing 40 (with the PCBs 47) is precisely positioned in the backbox 10. The lock ring 60 has a bottom flange 70 having recesses fitted with metal clips 74 having nubs 76 which extend radially inward from the surface 61, and engage circumferential slots 43 in housing 40. This engagement permits the lock ring 60 to rotate relative to housing 40, which is fixed against rotation in the backbox.

A locking pin 68 cooperates with detent mechanism 32 as will be described. The bottom flange 70 is provided with integral clips 72 for retaining dome window 56 at notches 58 on flange 57. A trim ring 80 snaps in place over the flange 70 and lock ring 60.

Figure 3:
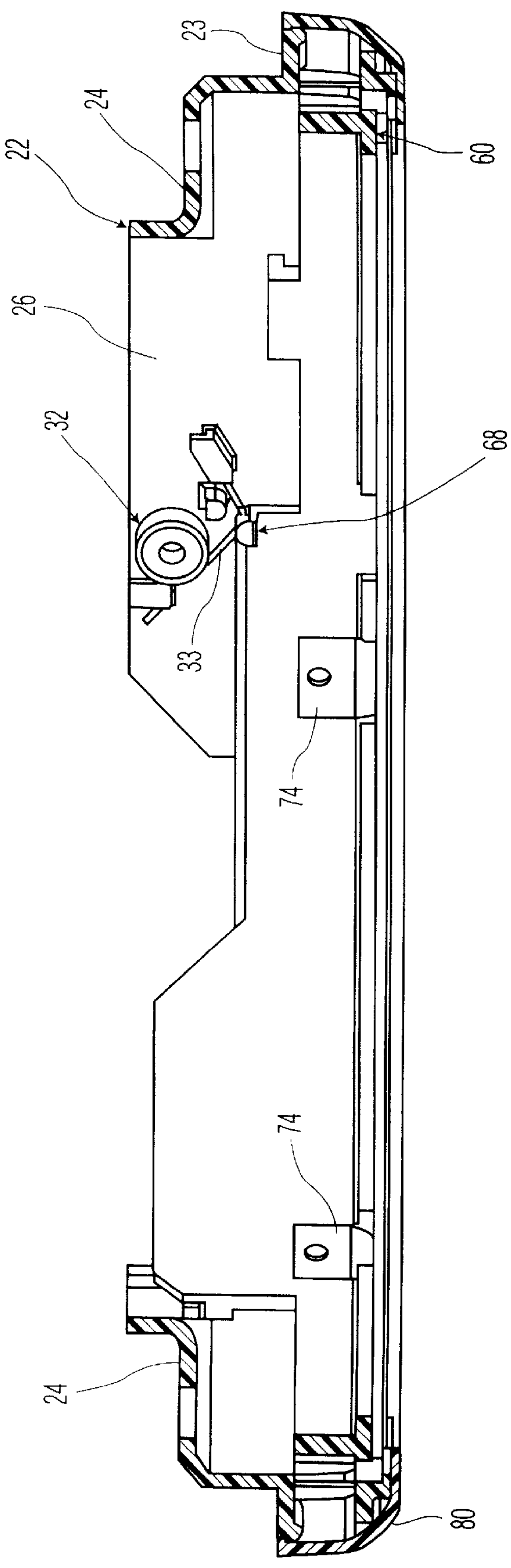
FIG. 3 is a cross-section of the backbox ring, lock ring, and trim ring.

FIG. 3 illustrates the cooperation between the backbox ring 22 and lock ring 60 in the locked position. The locking pin 68 deflects torsion spring 33, which snaps down behind the pin 68 as shown. At this point the lock ring 60 is drawn against bottom flange 23 of the backbox ring, and the camera housing 40 is fully received in cavity 15. To disengage the lock ring 60 when it is desired to remove the camera housing 40 (FIGS. 1 and 2), the trim ring 80 is removed from the flanges 23 on backbox ring 22. The lock ring 60 is counter-rotated to overcome the retaining force of the spring 33, and the followers 64, 66 move down the camming ridge 28 (FIG. 1).

Figure 4:
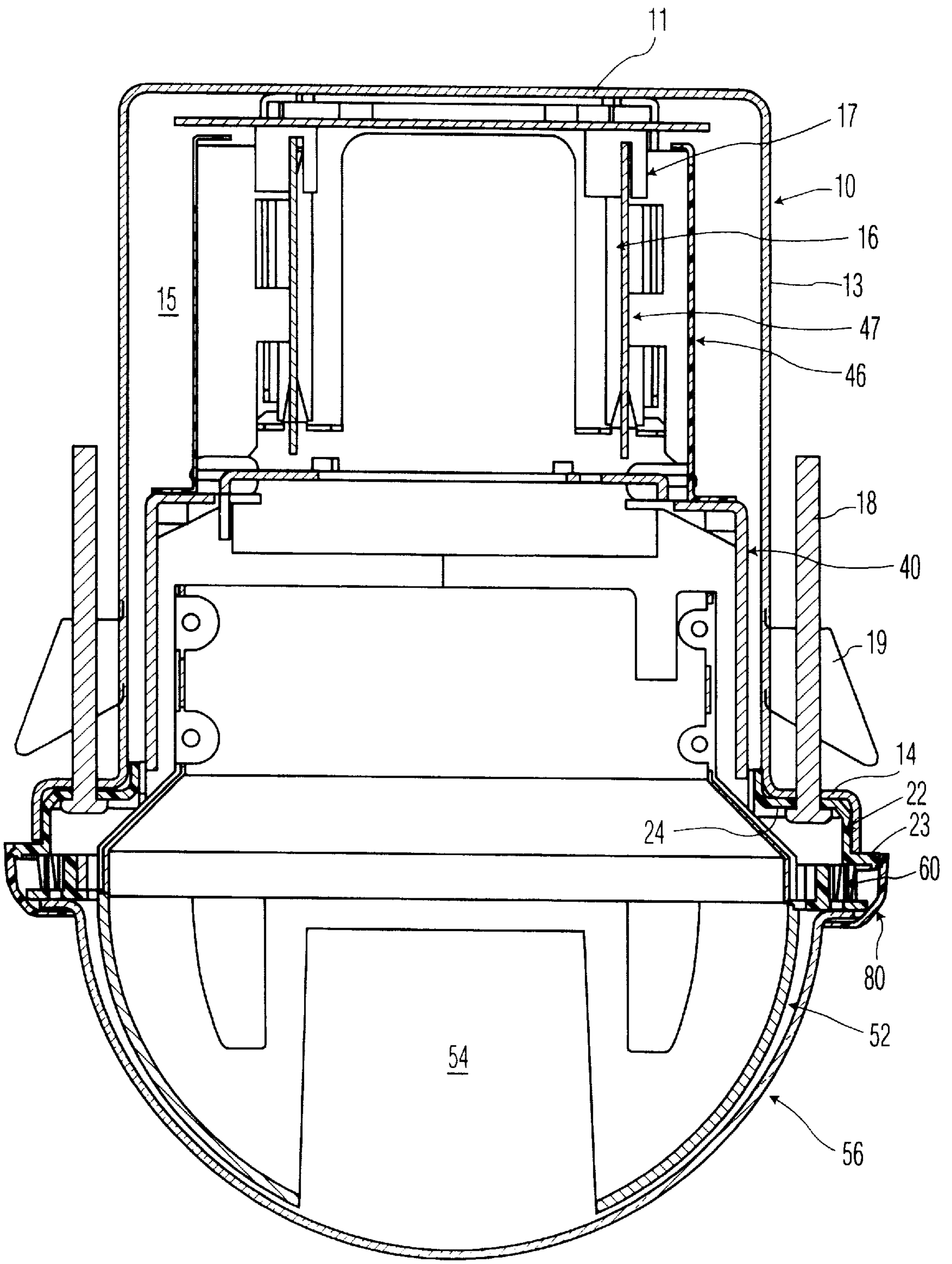
FIG. 4 is a cross-section of the complete assembly.

FIG. 4 is a cross-section of the complete assembly, sans camera and motors. Here the reception of PCBs 47 in guides 16 and edge connectors 17 is visible; this fit is facilitated by the keying of camera housing flats 44 between backbox flats 13. The edge connectors 17 provide the input signals which control pivotal movement of a camera about a horizontal axis in module 52, and likewise control rotational movement of the module 52 about a vertical axis with respect to the camera housing 40, which is fixed against rotation. Aperture 54 permits surveillance during this rotation. The mounting of the camera and drive motors to platform 50, as well as the retention of module 52, have been omitted for simplicity. Pins 18 are received through shoulders 24 of the backbox ring and shoulders 14 of the backbox, and are threaded into the upper portions of clips 19 for retention. Slots in the lower portions permit the clips to flex when the backbox 10 is fitted through a circular hole in a ceiling so that flange 23 is against the ceiling.

Figure 5:
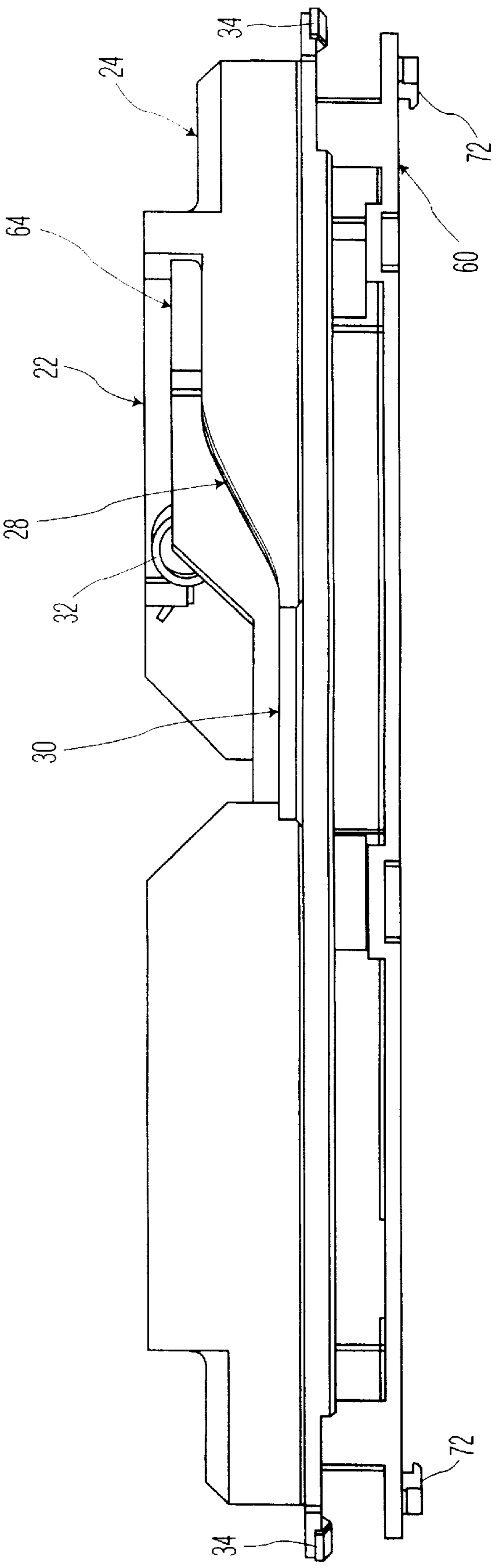
FIG. 5 is a sideview of the assembled lock ring and backbox ring.

FIG. 5 shows the backbox ring 22 and lock ring 60 as seen from the outside. The top follower 64 is seen on top of cam ridge 28, having been received through access slot 30 and moved upward by rotation. Clips 72 retain the dome window, while clips 34 on the backbox ring retain the trim ring. This permits the camera module to rotate without rotating the dome window, so that the rotation (and thus the object being observed) is not apparent.

It is also possible to remove the camera module and reinstall the dome window 56 and trim ring 80 with no camera present. If the dome window is tinted or fitted with an opaque liner, an observer will not be aware that the unit is not in service, giving more system flexibility through the use of dummy backboxes.

The backbox 10 preferably drawn aluminum, while the camera housing 40 is a two piece cast aluminum construction. The backbox ring 22 and lock ring 60 are molded of plastic such as polycarbonate. The dome window is clear or tinted acrylic, while the trim ring is ABS.

The foregoing is exemplary and not intended to limit the scope of the claims which follow.

What is claimed is:

1. Apparatus for mounting a surveillance camera, said apparatus comprising:

- a backbox having a cavity, an opening and a backbox ring with an inward facing cylindrical surface with first mating features thereon,
- a camera housing which is received in said opening and fixed against rotation in said cavity, and
- a locking ring including an outward facing cylindrical surface profiled for concentric reception in said inward facing cylindrical surface, said outward facing cylindrical surface having second mating features thereon, said second mating features being profiled to mate with said first mating features when said outward facing cylindrical surface is received in said inward facing cylindrical surface and said locking ring is rotated with respect to said backbox ring.

2. Apparatus as in claim 1 wherein said locking ring is rotatable from a disengaged position, wherein said camera housing can be removed from said backbox, to an engaged position, wherein said camera housing is held in said backbox.

3. Apparatus as in claim 1 wherein one of said first and second locking features comprises plurality of first circumferentially spaced projections which serve as top cam followers, and the other of said first and second locking features comprise a like plurality of circumferentially spaced camming ridges which bear against respective said top followers and urge said camera housing into said cavity as said locking ring is rotated.

4. Apparatus as in claim 3 wherein said second mating features comprise said projections and said first mating features comprise said camming ridges.

5. Apparatus as in claim 3 wherein one of said first and second mating features further comprises a like plurality of second circumferentially spaced projections which serve as bottom cam followers which cooperate with said camming ridges to limit penetration of said camera housing in said cavity of said backbox.

6. Apparatus as in claim 5 wherein each of said first circumferentially space projections is paired with one of said second circumferentially spaced projections so that one of said camming ridges is received therebetween.

7. Apparatus as in claim 3 wherein said cylindrical surface having said calming ridges projecting therefrom is provided with a like plurality of slots which receive said top followers for riding on top of respective said ridges.

8. Apparatus as in claim 1 wherein one of said first and second mating features comprises a spring loaded detent mechanism and the other of said first and second locking features comprises a locking pin which engages said detent mechanism to lock said locking ring against rotation with respect to said backbox, when said outward facing cylindrical surface is received in said inward facing cylindrical surface and said locking ring is rotated with respect to said backbox ring.

9. Apparatus as in claim 8 wherein said locking pin can be disengaged from said detent mechanism by reverse rotation of said locking ring with respect to said backbox ring.

10. Apparatus as in claim 1 further comprising a dome window which is releasably attached to said locking ring.

11. Apparatus as in claim 10 further comprising a trim ring which fits around said dome window and over said locking ring, said trim ring being releasably attached to said backbox ring.

12. Apparatus for mounting a surveillance camera said apparatus comprising:

- a backbox having a cavity and an opening,
- edge connectors disposed in said cavity,
- a camera housing having printing circuit boards mounted thereon, said camera housing being received in said cavity and said printed circuit boards mating with said edge connectors, and
- a locking ring engaging said backbox by rotation to hold said camera housing in said backbox.

* * * * *